United States Patent Office 3,532,865
Patented Oct. 6, 1970

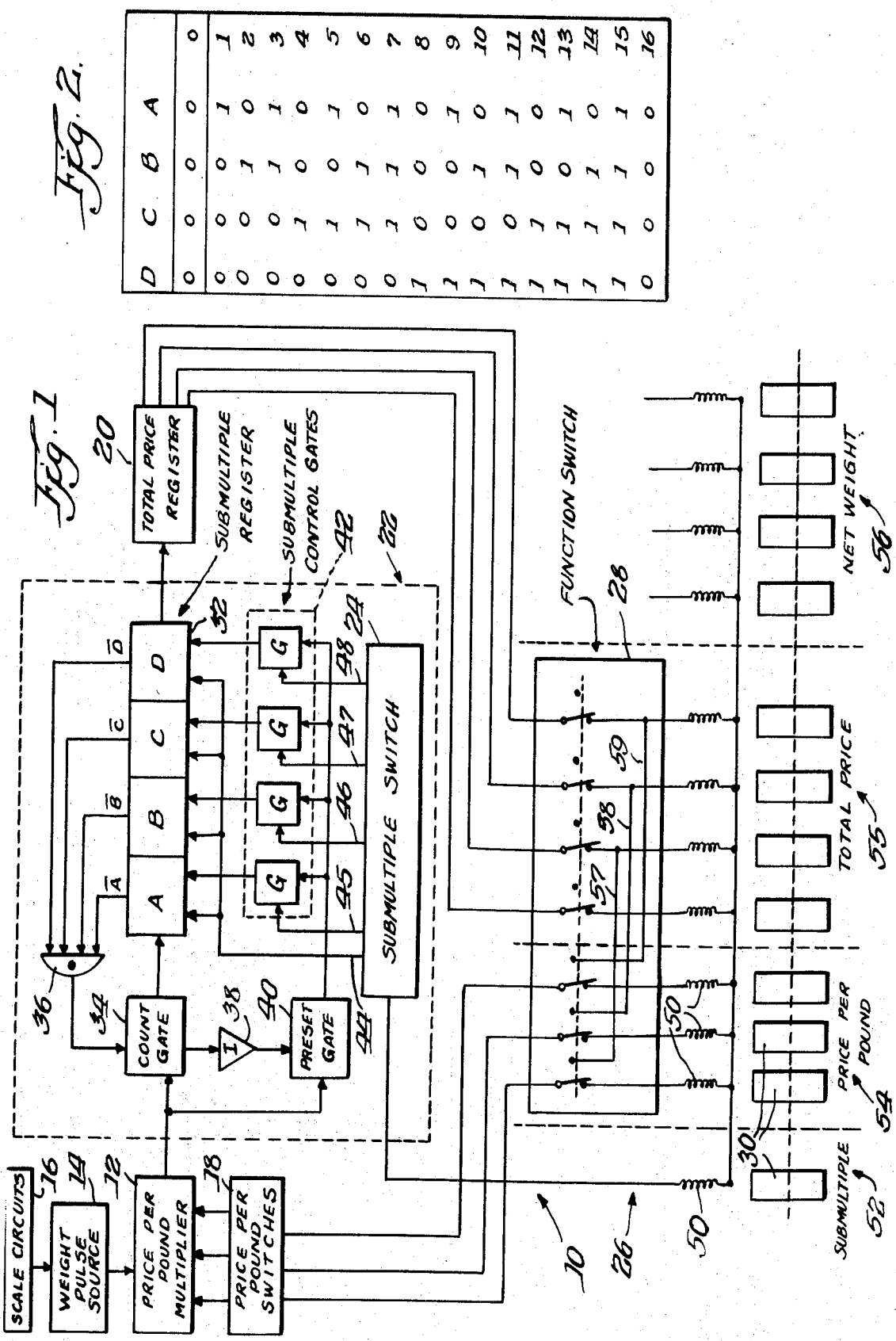

3,532,865
MULTIPLE UNIT PRICING
Edward C. Karp, 1001 E. Lincoln, Belvidere, Ill. 61008, and Jack S. Mason, 814 Belt Line Cove, Richardson, Tex. 75080
Filed Apr. 18, 1967, Ser. No. 631,640
Int. Cl. G06f 7/39; G01g 19/413
U.S. Cl. 235—160
5 Claims

ABSTRACT OF THE DISCLOSURE

An improvement in electronic computing scale systems including circuitry providing an output of price per a selected multiple of units or weight units, and selectable divider circuitry between the price per weight unit multiplier and the price register.

INTRODUCTION — BACKGROUND, SUMMARY, AND BRIEF DESCRIPTION OF THE DRAWINGS

The present invention relates to an improvement for increased functions in a weighing and computing apparatus, particularly those employed in digital computing scales used for example in super markets, etc. A preferred scale system in which the present invention is adapted to be incorporated is fully disclosed in Pat. No. 3,329,807 to Currie et al., issued July 4, 1967, and entitled "Price Computing and Marking Apparatus," application Ser. No. 337,619. This disclosure is incorporated herein by reference and is referred to herein as the "Currie et al. patent." It will be appreciated that the present invention is also applicable to other apparatus of the same general nature.

The present invention provides circuitry whereby products may be priced at a selected multiple number of units, i.e. 2 for 29¢, 3 for 98¢, etc. The invention further provides circuitry for automatically computing and printing out a price per a selected multiple weight unit, i.e. 2 lbs. for 59¢, 3 lbs. for 79¢, etc., without the use of reference charts or fractional price settings. The multiple unit pricing is accomplished by the operator solely through the presetting of switches which automatically control the computation and printing circuits of the system.

There are provided switching means for disconnecting the outputs of the price register from the price portions of the printer or other output means, for disconnecting the price per weight unit switches from the price per weight unit portion of the output means, and for connecting the price per weight unit switches to the price portion of the output means. There are further provided submultiple circuit means controlled by a submultiple switch for dividing the input to the price register from the price per weight unit multiplier by the price per multiple unit setting of the submultiple switch.

Further objects, features and advantages of the invention pertain to the particular arrangement and structure whereby the above mentioned aspects of the invention are attained. The invention will be better understood by reference to the following description and to the drawings forming a part thereof, wherein:

FIG. 1 is a schematic view of an exemplary embodiment of the invention; and

FIG. 2 is a truth table for the exemplary submultiple register in FIG. 1.

DESCRIPTION OF THE EXEMPLARY EMBODIMENTS

There is shown in FIG. 1 a multiple unit pricing circuit 10 in accordance with the present invention. The circuit 10 includes a price per pound multiplier 12 having an input of weight pulses from a weight pulse source 14 controlled by the scale weight sensing circuits 16. The price per pound multiplier 12 is controlled by a plurality of price per pound switches 18. The pulses from the price per pound multiplier 12 provide an input to a total price register 20. Connected therebetween is a submultiple circuit 22 providing a division of the pulse count input to total price register 20 by the price per multiple unit setting of a submultiple switch 24. The outputs of the total price register 20 communicate with and control a printer 26 through a function switch 28. The printer 26 has separate groups of separately controlled print wheels 30.

It will be appreciated that the schematic of FIG. 1 has been somewhat simplified herein for clarity of description. Reference to the above identified Currie et al. patent provides details of suitable circuitry and apparatus for the price per pound multiplier 12, the weight pulse source 14, the scale circuits 16, the price per pound switches 18, the total price register 20, and the printer 26. Further, the Currie et al. patent discloses other ancillary circuitry which are desirable, as for example amplifier and comparator circuits between the total price register 20 and the printer 26.

Considering now in greater detail the components of the submultiple circuit 22, the submultiple switch 24 controls a submultiple register 32 comprising a serial binary counter with four stages A, B, C and D. The input to the submultiple register 32 of the series of pulses from the price per pound multiplier 12 is controlled by a count gate 34. The count gate 34 in turn is operated by an "and" gate 36 controlled by all of the "not" functions $\bar{A}$, $\bar{B}$, $\bar{C}$ and $\bar{D}$. The "and" gate 36 also controls a preset gate 40 through an inverter 38. The preset gate 40 provides an initial preset operation of each stage of the submultiple register 32 through four respective submultiple control gates 42. Each of the submultiple control gates 42 is controlled by an output of the submultiple switch 24. The submultiple switch 24 here is a single multiple position switch having five parallel output leads 44 through 48, the latter four of which each control one of the submultiple control gates 42.

Considering now the basic operation of the components of the submultiple circuit 22 when dividing the input into the price register by a submultiple other than one, the submultiple circuit 22 is capable with only a four stage submultiple register 32 of division by any selected submultiple between one and sixteen. In this mode of operation, each stage A, B, C and D of the submultiple register 32 operates as a conventional flip-flop circuit serially connected. The input is into the first or A stage and the output to the total price register 20 is from the last or D stage. An output occurs from the submultiple circuit 22 when the submultiple register 32 goes from the 15 to the 16 condition, as shown in the truth table of FIG. 2, i.e. when the stage D changes from a one to a zero function.

It will be appreciated that there is preferably provided conventional circuitry (not shown) for zeroing the submultiple register 32 and the other elements of the scale system in the initiation of the operation of the system. Accordingly, the initial condition of the registers A through D is the zero position shown in the truth table of FIG. 2.

It will be noted that the price set on the price per pound switches 18 is the actual price for the multiple number of weight units and is set directly, unlike the conventional practice wherein multiple unit pricing must be accomplished by the use of a conversion chart or fractional price dials.

The selected setting of the submultiple switch provides a selected signal or absence of signal to each of the submultiple switch output leads 45, 46, 47 or 48 and thereby closes or opens, respectively, their respective submultiple control gate 42. The first incoming pulse of each division cycle goes through these submultiple gates 42 to preset the submultiple register 32 to seventeen minus the selected submultiple, or 16—($n-1$). Assuming, for example, that the particular submultiple which the operator has selected with the submultiple switch 24 is three, i.e. the price to be computed is the price per three pounds of the product or "3 for." The requisite presetting of the submultiple register is seventeen minus three or the 14 position of the truth table of FIG. 2. It may be seen that this requires a signal on lead 45 to close the submultiple control gate into register A.

Considering now the first incoming pulse in each divisional cycle from the price per pound multiplier 12, this first pulse will be blocked by the count gate 34. This is because, with the functions of the submultiple register all zeroed, the "not" functions are all one and the "and" gate 36 is thereby actuated to close the count gate. Conversely, due to the inverter 38, the preset gate 40 is open and thereby the first incoming pulse will pass through the preset gate and in parallel through any open submultiple control gates 42 to preset the submultiple register 32. It may be seen that this will occur only with the initial pulse, as with any other condition of the submultiple registers the "and" gate 36 will not be actuated, the count gate 34 will be open and the preset gate 40 will be closed. It will be appreciated that all of the various gates described herein may be of conventional circuitry.

Considering the second pulse, i.e., the next pulse after the initial or presetting pulse, the circuitry conditions now present include a setting in the submultiple register 32 of seventeen minus the submultiple and the count gate 34 being open. Accordingly, this pulse enters the A register of the submultiple register 32 and advances the count in the submultiple register by one, in this case from 14 to 15. The next or third incoming pulse similarly advances the count of the register, thus, in this example, advancing the count from 15 to 16. Reaching the 16 position provides an output of one pulse to the total price register 20, as previously described, and reopens the preset gate 40 to start a new cycle. Accordingly, it may be seen that for a submultiple switch setting of three only one pulse comes out of the submultiple circuit 22 for every three pulses applied thereto from the price per pound multiplier 12, i.e. the number of input pulses has been divided by the submultiple setting of the submultiple switch 24. The submultiple circuit 22 will cycle through the above described sequence until the computation period is completed, i.e. the termination of the application of pulses from the price per pound multiplier 12.

Considering now the operation of the submultiple circuit 22 for "straight-through" operation, i.e. a submultiple switch setting of one, it will be seen that the operation differs from that described above for a submultiple setting of two or more. One means of accomplishing this operation would of course be to provide a bypass circuit around the submultiple circuit 22 directly connecting for this setting the price per pound multiplier 12 to the total price register 20. However, the preferred arrangement described herein provides operation through the submultiple circuit 22.

When the submultiple switch 24 is switched to a submultiple unit setting of one, i.e. "1 for," a D.C. bias signal is applied to its output lead 44. It may be seen that this bias signal is applied through the lead 44 to an input of each stage A through D of the submultiple register 32. The bias signal converts each stage from its normal bistable operation to monostable operation. Thus an input pulse applied to the first stage A of the submultiple register 32 automatically triggers through all of the stages A through D to provide an output pulse and leaves the registers in their initial state. Thus the submultiple register 32 operates to pass all pulses directly therethrough without division. The bias signal applied by the lead 44 maintains the register in the 15 position of the truth table of FIG. 2, and accordingly the count gate 34 is open and the preset gate 40 closed for all pulses including the initial pulse.

Considering now the operation of the output means including the printer 26, the print wheels 30 are each independently controlled by a separate electrical circuit including preferably a solenoid operating coil 50. The print wheels 30 and their associated circuitry are in separate groups each providing separate output information. Preferably, one print wheel 30 provides a submultiple indicia 52 and is preferably directly controlled though its corresponding circuit by communication with the submultiple switch 24. The setting of the submultiple switch 24 is thereby automatically registered on the submultiple indicia 52. Preferably, a second group of three print wheels 30 provides a price per pound indicia 54. Similarly, there is preferably provided one group of four print wheels 30 providing a total price indicia 55, and another providing a net weight indicia 56.

It may be seen from FIG. 1 that each of the circuits operating the print wheels for the price per pound indicia 54 are normally connected to respective ones of the outputs of the price per pound switches 18. Similarly, each of the circuits for the print wheels of the total price indicia 55 are normally connected to and operated by the parallel outputs of the total price register 20.

As previously mentioned, the various connections shown herein are simplified for description, and intervening circuitry is preferably provided as taught in the Currie et al. patent.

It may be seen that all of the inputs from the price per pound switches 18 into the price per pound indicia 54 and all of the inputs from the total price register 20 into the total price indicia circuit for the total price indicia 55 pass through a single integral function switch 28. The function switch 28 is ganged to simultaneously operate the seven separate switch elements therein. The function switch 28 is preferably a multiple pole double-throw switch, which in its normal position simply connects the circuits straight through in the manner described above.

When the function switch 28 is operated, causing each pole to be thrown to its other contact, it may be seen that all of the outputs from the total price register 20 are disconnected from the circuits of the total price indicia 55. Further, the outputs from the price per pound switches are disconnected from the circuits for the price per pound indicia 54. However, the second contacts of the switch elements associated with the outputs of the price per pound switches 18 are individually connected to the respective individual circuits for the total price indicia 55 by the leads 57, 58 and 59 respectively. Thus with the function switch 28 actuated, the setting of the price per pound switches 18 appears on the print wheels 30 normally providing the total price indicia 55 instead of the price per pound indicia 54.

It will be noted that the submultiple indicia 52 and its corresponding circuitry are not affected. Accordingly, with the function switch 28 actuated, the computing scale system including the printer 26 may be employed for multiple pricing operations. In such an operation, the submultiple switch is set to the selected price per multiple unit setting, i.e. the number of pieces or units to be priced together. The price per pound switches 18 are set to the total price for the multiple number of pieces. For example, if it is desired to print pricing labels for three grapefruits for 25¢ the price per pound switches 18 will be set for 25¢, the submultiple switch 24 will be set to three, and the function switch will be actuated. The printer 26 will then print labels indicating three units for a total price of 25¢.

Reviewing briefly the operation of the multiple unit pricing circuit 10, it may be observed that the operator need only operate three sets of switches: the price per pound switches 18, the single submultiple switch 24 and the single function switch 28. For the normal or price by weight operation, the function switch 28 is in the normal position shown in FIG. 1. The price per pound switches 18 are set to the total price for the selected multiple weight units rather than the price per pound, unless of course the submultiple switches are set to the one or straight-through position in which case the setting would be the actual price per one pound. It will be appreciated of course that, while the weight unit described herein is a pound, any other weight unit such as kilograms may be employed. The submultiple switch 24 is set to the desired submultiple or number of units to be grouped per price. The operation of the remainder of the entire computing scale system may then be identical to that disclosed for example in the Currie et al. patent.

It may be seen that there has been described herein an improved arrangement for computing scale systems which provides novel features, increased flexibility and new applications. It may be seen that this arrangement is both simple and effective in structure and in operation. The apparatus described herein is presently considered to be preferred; however, it is contemplated that further variations and modifications within the purview of those skilled in the art can be made herein. The following claims are intended to cover all such variations and modifications as fall within the true spirit and scope of the invention.

What is claimed is:

1. In a computing scale system the combination comprising:
   output means having a plurality of variable separately controlled output indicia, said variable output indicia including a submultiple indicia, a grouped plurality of price per weight unit indicia and a grouped plurality of price indicia;
   a plurality of multiple position price per weight unit switches positionable to a selected price per weight unit setting and controlling said price per weight unit indicia of said output means;
   a submultiple switch positionable to a selected multiple unit setting and controlling said submultiple indicia of said output means;
   a digital price per weight unit multiplier controlled by said price per weight unit switches;
   a digital price register having an input from said price per weight unit multiplier, said price register having a plurality of outputs normally controlling said price indicia of said output means;
   submultiple circuit means controlled by said submultiple switch for dividing the input to said price register from said price per weight unit multiplier by said multiple unit setting of said submultiple switch comprising a plurality of control gates connected to said submultiple switch;
   and means for gating said control gates in response to a selective position of said multiple position price per weight switches.

2. The combination of claim 1 wherein said submultiple circuit means includes a submultiple register presettable to a selected count therein by said submultiple switch.

3. In a computing scale system the combination comprising:
   output means having a plurality of variable separately controlled output indicia, said variable output indicia including a submultiple indicia, a grouped plurality of price per weight unit indicia and a grouped plurality of price indicia;
   a plurality of multiple position price per weight unit switches positionable to a selected price per weight unit setting and controlling said price per weight unit indicia of said output means;
   a submultiple switch positionable to a selected multiple unit setting and controlling said submultiple indicia of said output means;
   a price per weight unit multiplier controlled by said price per weight unit switches;
   gating means selectively controlled by said submultiple switch;
   a price register having an input from said price per weight unit multiplier, said price register having a plurality of outputs normally controlling said price indicia of said output means;
   and integral switching means for disconnecting all of said outputs of said price register from said output means.

4. The combination of claim 3 wherein said integral switching means includes means for disconnecting said price per weight unit switches from said price per weight unit indicia of said output means, and for connecting said price per weight unit switches to said price indicia of said output means.

5. In a computing scale system the combination comprising:
   output means having a plurality of variable separately controlled output indicia, said variable output indicia including a submultiple indicia, a grouped plurality of price per weight unit indicia and a grouped plurality of price indicia;
   a plurality of multiple position price per weight unit switches positionable to a selected price per weight unit setting and controlling said price per weight unit indicia of said output means;
   a submultiple switch positionable to a selected multiple unit setting and controlling said submultiple indicia of said output means;
   a digital price per weight unit multiplier controlled by said price per weight unit switches;
   a digital price register having an input from said price per weight unit multiplier, said price register having a plurality of outputs normally controlling said price indicia of said output means;
   and submultiple circuit means controlled by said submultiple switch for dividing the input to said price register from said price per weight unit multiplied by said multiple unit setting of said submultiple switch comprising a plural stage serially connected register having an input to its first stage from said price per weight unit multiplier and an output from its last stage to said price register and a maximum count at which an output is provided to said price register;
   said submultiple circuit means further comprising a plurality of submultiple control gates connecting with individual stages of said serially connected register and having an input from said price per weight unit multiplier, said submultiple control gates being variably controlled by the selected multiple unit setting of said submultiple switch, and means for gating only the first of a series of pulses from said price per weight unit multiplier through said submultiple control gates for presetting said serially connected register to said maximum count in said serially connected register plus a constant minus said selected multiple unit setting of said submultiple switch.

References Cited

UNITED STATES PATENTS

| | | | |
|---|---|---|---|
| 3,055,585 | 9/1962 | Bell et al. | 235—160 |
| 3,235,713 | 2/1966 | Stern | 235—61.6 |
| 3,262,639 | 7/1966 | Karp | 177—3 X |
| 3,276,526 | 10/1966 | Loshbough | 177—3 X |
| 3,329,807 | 7/1967 | Currie et al. | 235—160 X |
| 3,384,827 | 5/1968 | Noordanus et al. | 328—42 |

MALCOLM A. MORRISON, Primary Examiner

C. E. ATKINSON, Assistant Examiner

U.S. Cl. X.R.

177—3; 235—61.6, 151.33